United States Patent
Hopkins

(10) Patent No.: US 10,966,415 B2
(45) Date of Patent: Apr. 6, 2021

(54) APPARATUS FOR SORTING MARINE SPECIES IN FISH TRAWL

(71) Applicant: United States of America, as represented by the Secretary of Commerce, Silver Spring, MD (US)

(72) Inventor: Nicholas Hopkins, Gautier, MS (US)

(73) Assignee: UNITED STATES OF AMERICA AS REPRESENTED BY THE SECRETARY OF COMMERCE, Silver Spring, MD (US)

( * ) Notice: Subject to any disclaimer, the term of this patent is extended or adjusted under 35 U.S.C. 154(b) by 355 days.

(21) Appl. No.: 16/007,640

(22) Filed: Jun. 13, 2018

(65) Prior Publication Data

US 2019/0069529 A1    Mar. 7, 2019

Related U.S. Application Data

(60) Provisional application No. 62/518,658, filed on Jun. 13, 2017.

(51) Int. Cl.
*A01K 75/00* (2006.01)
*A01K 73/02* (2006.01)

(52) U.S. Cl.
CPC .............. *A01K 73/02* (2013.01); *A01K 75/00* (2013.01)

(58) Field of Classification Search
CPC ........ A01K 73/00; A01K 73/02; A01K 74/00; A01K 75/00; B63B 35/16
See application file for complete search history.

(56) References Cited

U.S. PATENT DOCUMENTS

| | | | | | |
|---|---|---|---|---|---|
| 1,745,251 | A | * | 1/1930 | Enright | A01K 74/00 43/6.5 |
| 3,015,903 | A | * | 1/1962 | Willingham | A01K 73/02 43/9.1 |
| 4,739,574 | A | * | 4/1988 | Saunders | A01K 73/02 43/9.2 |
| 4,805,335 | A | * | 2/1989 | West | A01K 73/02 43/9.2 |
| 4,869,010 | A | * | 9/1989 | Saunders, Sr. | A01K 73/02 43/9.2 |
| 5,076,000 | A | * | 12/1991 | Anthony | A01K 75/00 43/9.2 |
| 5,222,318 | A | * | 6/1993 | Stokes, Jr. | A01K 75/00 43/9.2 |
| 5,325,619 | A | * | 7/1994 | Paul | A01K 73/02 43/9.2 |

(Continued)

*Primary Examiner* — Peter M Poon
*Assistant Examiner* — Marisa V Conlon

(57) ABSTRACT

Embodiments of the present invention relate to methods and apparatus for sorting undesired marine species during trawling, provides a pliable grid when the trawl net is pulled from the water and wound tightly on the net reel, and when the trawl is deployed in the water, the apparatus is fixed into place inside the trawl and holding its shape with consistent grid spacing. Marine species sorting apparatus in accordance with embodiments of the present invention includes grid, back straps, and lead ring. Grid includes a plurality of bars surrounded by grid frame. Grid frame is attached to lead ring at an angle using terminal couplers. Lead ring supports grid and secures marine species sorting apparatus in trawl webbing referred to as the extension.

13 Claims, 12 Drawing Sheets

(56) References Cited

U.S. PATENT DOCUMENTS

| | | | | |
|---|---|---|---|---|
| 5,575,102 A | * | 11/1996 | Coulon | A01K 75/00 43/104 |
| 6,223,462 B1 | * | 5/2001 | Johannesson | A01K 73/02 43/9.2 |
| 6,343,433 B1 | * | 2/2002 | Granberg | A01K 75/00 114/255 |
| 8,191,305 B2 | * | 6/2012 | Gallagher | A01K 73/02 43/9.1 |
| 9,877,466 B2 | * | 1/2018 | Rommelaere | A01K 73/10 |
| 9,961,887 B2 | * | 5/2018 | Ma | A01K 73/06 |

* cited by examiner

APPARATUS FOR SORTING MARINE SPECIES IN FISH TRAWL

CROSS-REFERENCE TO RELATED APPLICATION

This application claims the benefit of priority from U.S. Provisional Patent Application Ser. No. 62/518,658, filed on Jun. 13, 2017, the disclosure of which is incorporated herein by reference.

STATEMENT REGARDING FEDERAL RIGHTS

The invention described herein was made with support from the National Oceanic and Atmospheric Administration (NOAA) of the United States Department of Commerce. The United States Government has certain rights in the invention.

FIELD OF THE INVENTION

The present disclosure relates generally to a fishing trawl device for selectively excluding undesired marine species from target species while harvesting.

BACKGROUND OF THE INVENTION

A function of a fish or shrimp trawl is to filter the sea life and benthic organisms from the water but, by design, a trawl can be indiscriminate. Environmental concerns have driven efforts to protect many marine species in a trawl's pathway. Many trawl fisheries have been incorporating devices such as sorting grids to exclude bycatch (protected or unmarketable composition of the catch) such as sea turtles, sharks, rays, seals, sturgeon, marine mammals, etc. The diminished weight and labor involved in handling the unwanted bycatch reduces fuel consumption, minimizes wear and tear on the gear, and lowers the cost of labor. Typically, a rigid sorting grid is sewn inside of a trawl where the catch is collected and enables removal of bycatch without any significant loss of the target species.

An example of a rigid sorting grid incorporated into a trawl is the Turtle Excluder Device (TED), which allows a protected sea turtle caught in shrimp trawl equipped with a TED to escape. TED grids physically direct bycatch larger than the bar spacing towards an opening in the webbing. Large sharks and sea turtles are separated and removed from the catch as the shrimp are collected in the cod end.

Rigid metal sorting grids are effective in shrimp trawls, but transferring that technology to a fish trawl is challenging. Fish trawls are often longer and heavier than shrimp trawls, which lead to the application of net reels to retrieve and deploy fish trawls. Winding a trawl onto a net reel creates torsion in the cables and webbing that can crush rigid grids when they are placed under each successive wrap of webbing and lines. Large scale fish trawls are made to be strong and pliable. Under extreme commercial fishing conditions, heavy loads and unpredictable sea conditions constantly test the integrity of the gear. A trawl built to hold 10,000 lbs. of catch should be expected to endure a magnitude of that weight when the catch is pulled through the water at high speeds, bounced across the sea floor, winched in by a boat in pitching seas (especially when the gear is at the surface), and finally lifted and discharged on deck. It is most likely the gear will begin to fail and fall apart at the point where an unyielding inflexible structure such as a rigid grid is sewn into the webbing of the trawl. Webbing distributes the stress of a heavy load over many knots and bars making meshes that can flex open and closed, absorbing stress and shock. When webbing is seized to a rigid frame this property is limited or lost and the ability of the trawl to withstand challenging conditions is compromised. A rigid structure sewn into a trawl will cause additional stress to the webbing under a heavy load and will diminish the overall loading capacity of the trawl.

A rigid grid is limited in how it can bend around a net reel and could break when the net reel applies excessive stress to the rigid grid. Another disadvantage of a rigid flat grid device in a fish trawl is the manner in which it filters the catch. The grid is sewn at an angle in the extension at the tail of the trawl, and is pitched towards an opening that allows turtles to escape from the trawl. A slow steady stream of fish has time to filter between the bars of the grid, but the trawl efficiency decreases when the rigid grid encounters a high volume of fish all at once. The webbing in front of the grid, especially around the opening, is unrestricted. When a large volume of fish is packed into the trawl the grid acts as a bottle neck that chokes down the webbing right behind the opening. As the limited amount of catch passes through the grid, or when the grid is overwhelmed and clogged, the mass in front of the grid quickly increases and expands in the webbing in front of the grid. The opening at the posterior end of the grid acts as a pressure relief for the built-up volume of fish packed ahead of the grid. When this occurs, a limited amount of fish will have time to pass through to the cod end of trawl net before the rest are discharged out of the opening.

Accordingly, there is a need for a trawl sorting grid device that provides a pliable grid when the net is pulled from the water and wound tightly on the net reel, and when the trawl is deployed in the water, the device is fixed into place inside the trawl and holds its shape with consistent grid spacing. There is also a need for a trawl sorting grid device that is strong enough to endure the repetitive, high volume and heavy loads of a commercial application while withstanding the punishing weather and sea conditions.

SUMMARY OF THE INVENTION

Embodiments of the present invention relate to methods and apparatus for sorting undesired marine species during trawling that provides a pliable grid when the trawl net is pulled from the water and wound tightly on the net reel, and when the trawl is deployed in the water, the apparatus is fixed into place inside the trawl and holding its shape with consistent grid spacing.

Accordingly, embodiments of the present invention relate to an apparatus for excluding undesired marine species from a trawl net during trawling, including a plurality of bars arranged in a symmetrical layout extending along a direction substantially traversing longitudinal axis of the trawl net, wherein the plurality of bars are separated by at least one predetermined bar spacing, wherein each of the plurality of bars has a predetermined length, wherein the plurality of bars have a predetermined stiffness; a grid frame surrounding the plurality of bars to form an opening at posterior end of the apparatus, wherein distal ends of at least two of the plurality of bars positioned distally from at least one of the plurality of bars positioned at the center of the grid frame is secured to the grid frame, wherein the opening formed at the posterior end of the apparatus allows for the undesired marine species to exit the trawl net; a plurality of back straps secured to at least one of the plurality of bars at a predetermined location, wherein each of the plurality of back straps is positioned perpendicular to the plurality of bars, wherein the plurality of back straps are positioned below the grid frame, wherein the plurality of back straps are separated by at least one predetermined distance; a grid frame extension secured to the grid frame to extend the posterior end of the apparatus above the opening, wherein the grid frame extension forms a curvature to receive flap netting positioned to seal the opening, wherein distal ends of the plurality of bars positioned proximally at center of the apparatus is secured to the grid frame extension, wherein the center bar is secured to the grid frame extension at apex of the curvature formed by the grid frame extension; a lead ring secured to ends of each of the plurality of back straps and proximal end of at least one of the plurality of bars, wherein the lead ring offsets the plurality of back straps and hold the plurality of bars at a predetermined angle, wherein the lead ring funnels marine species entering the trawl towards the plurality of bars; and a plurality of terminal couplers for securing the ends of each of the plurality of back straps and the proximal end of at least one of the plurality of bars to the lead ring, wherein the plurality of terminal couplers are oriented in a direction substantially facing the posterior end of the apparatus, wherein said apparatus is adapted for insertion within the trawl body before cod end of the trawl net, wherein lead ring is secured to fishing circle in the trawl net along a row of meshes perpendicular to the longitudinal axis of the trawl net, and wherein the back straps are secured to extension webbing in the trawl net. More particularly, each of the plurality of bars is a 1×19 stainless steel cable, and wherein each of the plurality of back straps is a 6×19 stainless steel cable. In one embodiment of the present invention, the plurality of back straps is secured to at least one of the plurality of bars with tuck splicing.

In some embodiments of the present invention, the lead ring is secured to proximal end of at least one of the plurality of bars. More particularly, the lead ring is a round hoop or a semi-circular hoop. In other embodiments of the present invention, the lead ring further includes a first lead ring secured to first ends of the plurality of back straps; and a second lead ring secured to second ends of the plurality of back straps, wherein the lead ring is open at top and bottom of the apparatus. More particularly, the proximal end of the plurality of bars are secured to at least one of the plurality of back straps secured to the first and second lead rings.

In one aspect of the present invention, the bar spacing separating the plurality of bars positioned proximal to the center of the grid frame is narrower than the bar spacing separating the plurality of bars positioned distally from the center of the grid frame.

In another aspect of the present invention, the at least one of the plurality of back straps positioned distally from the grid frame is shorter than the at least one of the plurality of back straps positioned proximal to the grid frame.

Some embodiments of the present invention further include a plurality of floats secured to predetermined locations on the plurality of bars, wherein the plurality of floats provide buoyancy to the apparatus.

In one embodiment of the present invention, the distance separating the ends of plurality of back straps is shorter than the distance separating the plurality of back straps proximal to the at least one of the plurality of bars positioned at the center of the grid frame.

Another embodiment of the present invention relates to an apparatus for excluding undesired marine species from a trawl net during trawling, including a grid comprising an array of plurality of bars and a plurality of back straps, wherein each of the plurality of bars is secured to at least one of the plurality of back straps at a predetermined location, wherein the plurality of bars are arranged vertically in a symmetrical layout on either side of a center bar, wherein the plurality of bars are spaced apart by at least one predetermined distance, wherein each of the plurality of bars has a predetermined length, wherein each of the plurality of back straps is positioned perpendicular to the plurality of bars; a grid frame surrounding the plurality of bars to form an opening at posterior end of the apparatus, wherein distal ends of at least two of the plurality of bars positioned distally from the center bar is secured to the grid frame, wherein the at least one of the plurality of back straps positioned distally from the grid frame is shorter than the at least one of the plurality of back straps positioned proximal to the grid frame, wherein the distance separating the ends of plurality of back straps is shorter than the distance separating the plurality of back straps proximal to the at least one of the plurality of bars positioned at the center of the grid frame, wherein the opening formed at the posterior end of the apparatus allows for the undesired marine species to exit the trawl net; a grid frame extension secured to the grid frame to extend the posterior end of the apparatus above the opening, wherein the grid frame extension forms a curvature to receive flap netting positioned to seal the opening, wherein distal ends of the plurality of bars positioned proximally at center of the apparatus is secured to the grid frame extension, wherein the center bar is secured to the grid frame extension at apex of the curvature formed by the grid frame extension; a lead ring for funneling marine species entering the trawl towards the plurality of bars, wherein ends of each of the plurality of back straps and proximal end of at least one of the plurality of bars are secured to the lead ring, wherein the lead ring offsets the plurality of back straps and hold the plurality of bars at a predetermined angle, wherein the lead ring is secured to fishing circle along a straight row of meshes perpendicular to a direction the trawl net is pulled; a plurality of terminal couplers for securing the ends of each of the plurality of back straps and the proximal end of at least one of the plurality of bars to the lead ring, wherein the plurality of terminal couplers are oriented in a direction substantially facing the posterior end of the apparatus; and a plurality of floats secured to predetermined locations on the plurality of bars, wherein the plurality of floats provide buoyancy to the apparatus, wherein said apparatus is adapted for insertion within the trawl body before cod end of the trawl net, wherein lead ring is secured to fishing circle in the trawl net along a row of meshes perpendicular to the longitudinal axis of the trawl net, and wherein the back straps are secured to extension panel in the trawl net. More particularly, each of the plurality of bars is a 1×19 stainless steel cable, and wherein each of the plurality of back straps is a 6×19 stainless steel cable. In one aspect of the present invention, the lead ring is a round hoop.

In one embodiment of the present invention, bar spacing separating the plurality of bars positioned proximal to the center of the grid frame is narrower than the bar spacing separating the plurality of bars positioned distally from the center of the grid frame.

Embodiments of the present invention also relate to an apparatus for excluding undesired marine species from a trawl net during trawling, including a first grid panel comprising a plurality of first bars arranged horizontally in a symmetrical layout on either side of a first center bar, wherein each of the plurality of first bars is secured to at least one of a plurality of first back straps at a predetermined location, wherein the plurality of first bars are spaced apart by at least one predetermined distance, wherein each of the plurality of first bars has a predetermined length, wherein each of the plurality of first back straps is positioned perpendicular to the plurality of first bars; a second grid panel comprising a plurality of second bars arranged horizontally in a symmetrical layout on either side of a second center bar, wherein each of the plurality of second bars is secured to at least one of a plurality of second back straps at a predetermined location, wherein the plurality of second bars are spaced apart by at least one predetermined distance, wherein each of the plurality of second bars has a predetermined length, wherein each of the plurality of second back straps is positioned perpendicular to the plurality of second bars; a center post connecting the first and second grid panels, wherein proximal ends of the plurality of first and second bars are secured to the center post; a rectangular lead ring connected to the ends of the center post, wherein the longitudinal axis of the lead ring is perpendicular to the center post; a plurality of setbacks positioned between the first and second grid panels and the lead ring to support the first and second grid panels in a V-shape; a plurality of terminal couplers for securing the ends of each of the plurality of the first and second back straps and the proximal ends of the plurality of the first and second bars to the center post, wherein the plurality of terminal couplers secure the plurality of setbacks to the first and second grid panels and the lead ring, wherein said apparatus is adapted for insertion within the trawl body before cod end of the trawl net, wherein lead ring is secured to fishing circle in the trawl net along a row of meshes perpendicular to the longitudinal axis of the trawl net, and wherein the back straps are secured to the top quarter of extension panel in the trawl net. More particularly, each of the plurality of setbacks is positioned at substantially same locations as the plurality of the first and second back straps. In one embodiment of the present invention, each of the plurality of back straps is a 6×19 stainless steel cable, and wherein each of the plurality of back straps is a 6×19 stainless steel cable. In another embodiment of the present invention, each of the first and second grid panels have a length of about 5 feet and a height of about 3 feet.

DETAILED DESCRIPTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
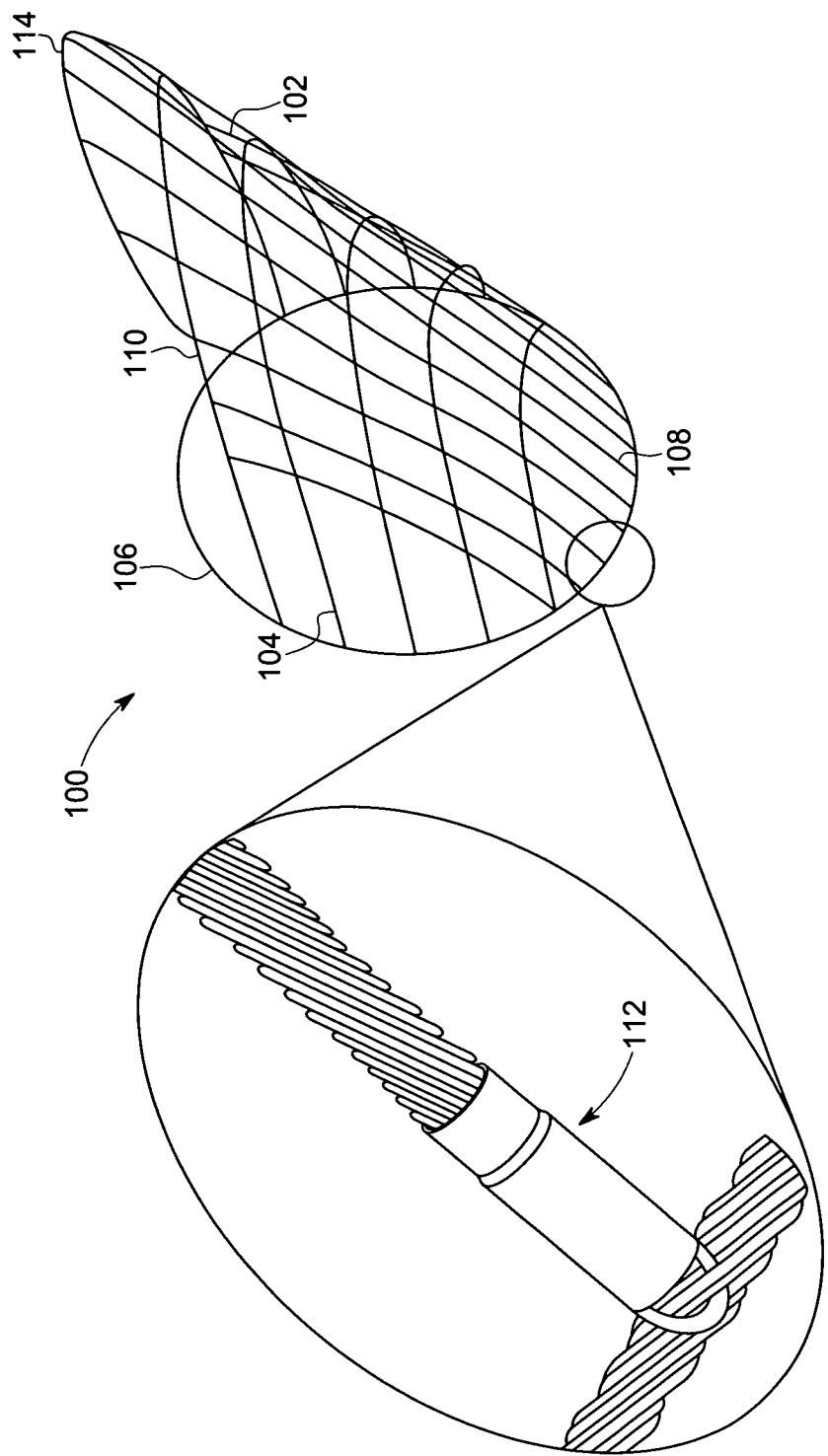
FIG. 1 illustrates a marine species sorting apparatus in accordance with an embodiment of the present invention.

Referring now to the drawings, and more particularly, to FIG. 1, there is shown an apparatus for sorting marine species during trawling, generally designated 100, which comprises embodiments of the present invention. Marine species sorting apparatus 100 includes grid 102, back straps 104, and lead ring 106. Grid 102 includes a plurality of bars 108 surrounded by grid frame 110. Grid frame 110 surrounding bars 108 form an opening at posterior end of grid 102 to allow for the undesired marine species to exit the trawl net. Grid frame 110 is attached to lead ring 106 at an angle using terminal couplers 112. Lead ring 106 supports grid 102 and secures marine species sorting apparatus 100 in trawl webbing referred to as the extension.

Grid 102 includes a plurality of bars 108, each having a predetermined length and separated from each other by a predetermined bar spacing. Bars 108 are formed by cable or wire rope having a predetermined stiffness. In an embodiment of the present invention, bars 108 are made of 1×19 stainless steel cables. Each cable or wire rope include multi-wire strands arranged around a core. As used herein, the term "strand" refers to a grouping of wires wound together into individual cords that together make a wire rope. A wire rope is typically denoted by the number of strands, the number of wires in each strand and a description of its construction. For example, 1×19 cable denotes a wire rope that includes 1 strand made from 19 wires, and 6×19 IWRC denotes a wire rope including 6 strands having 19 wires per strand with 6 strands arranged around 1 Independent Wire Rope Core (IWRC). Typically, a 1×19 cable is stiffer than 6×19 IWRC, provided that they are both made of the same material with same overall diameter.

Figure 2:
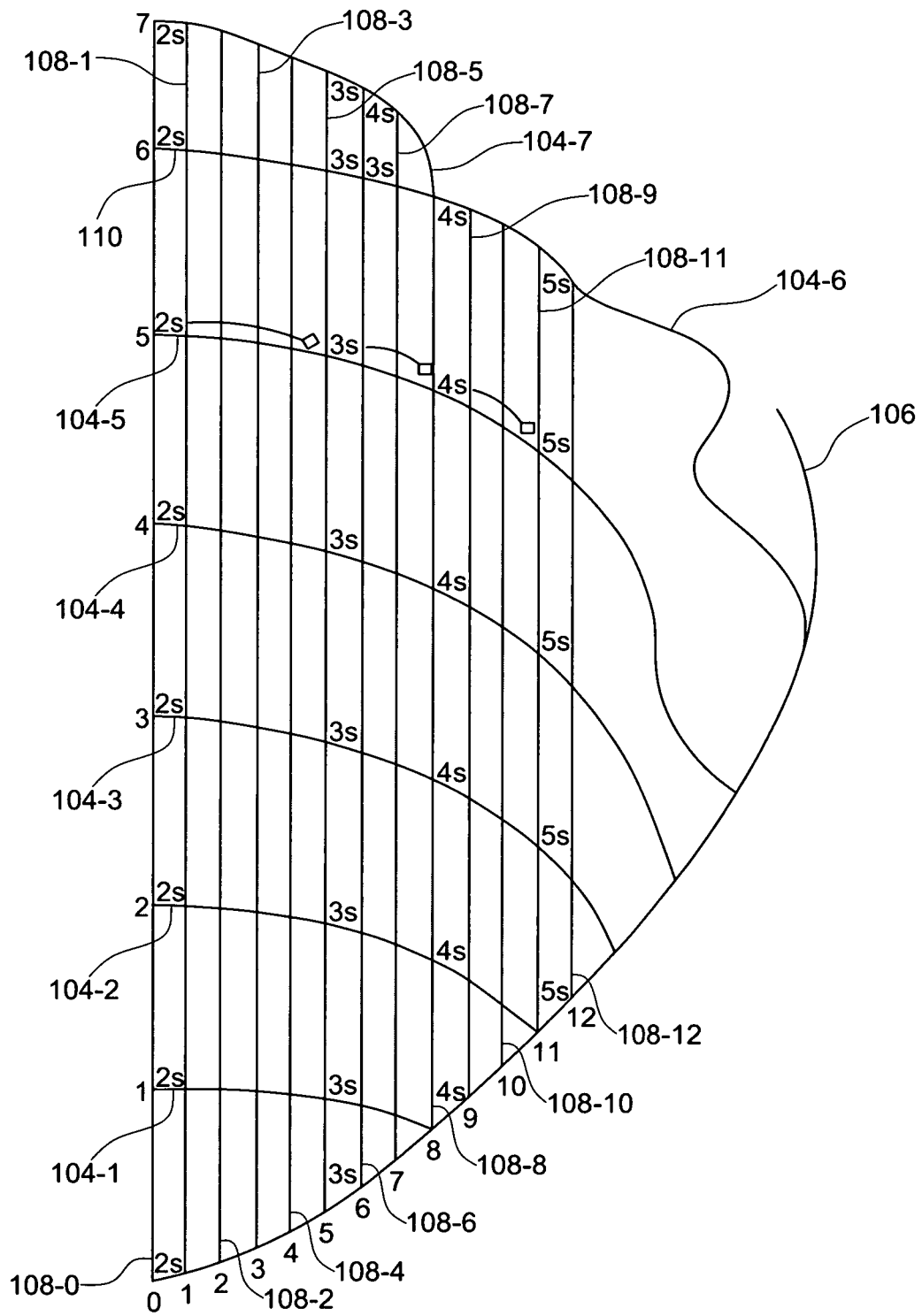
FIG. 2 illustrates an exemplary layout representing half grid of marine species sorting apparatus in accordance with an embodiment of the present invention.

Bars 108 are arranged in a predetermined layout. FIG. 2 illustrates an exemplary layout representing half grid for an embodiment of marine species sorting apparatus 100. In one embodiment of the present invention, bars 108 are arranged in a symmetrical layout on either side of a center bar 108-0 extending along a direction substantially traversing longitudinal axis of the trawl net. In another embodiment of the present invention, bars 108 are arranged vertically in a symmetrical layout on either side of a center bar 108-0, as shown in FIGS. 1 and 2. Bar 108-1 is positioned next to bar 108-0 and bar 108-12 is positioned farthest away from bar 108-0, as shown in FIG. 2. In the embodiment shown in FIGS. 1 and 2, bar 108-0 is the longest bar and bar 108-12 is the shortest bar. The bottom end of each of bars 108-0 to 108-12 is connected to lead ring 106.

Back straps 104 are cables positioned perpendicular to bars 108 to provide support to bars 108 and fix the spacing between bars 108. Back straps 104 are typically softer and flexible cable than bars 108. In an embodiment of the present invention, back straps 104 are made of the 6×19 cables. The difference in cables types determines the function of the cable grid. Stiffer cable helps maintain spacing between bars 108, and more yielding cables in grid frame 110 and back straps 104 allow grid 102 to compact and reengage as marine species sorting apparatus 100 is crushed on a net reel and then deployed repeatedly. In the embodiment shown in FIGS. 1 and 2, back straps 104 are arranged horizontally with shortest back strap 104-1 at the bottom of grid 102 and the longest back strap 104-6 at the top of grid 102. Back strap 104-6 is the longest backstrap and forms grid frame 110 around the opening at the posterior end of grid 102. Back strap 104-6 is also referred to as the Opening Back Strap (OBS). Anchored to back strap 104-6 is a grid frame extension (GFE) 114, which is also referred to as the last back strap and shown as back strap 104-7 in FIG. 2. Back straps 104 positioned in the middle or the upper portion of grid 102 influence the slope of bars 108. In an exemplary embodiment of the present invention, back straps 104 positioned in the middle or the upper portion of grid 102 provide bars 108 with a slope having an angle of about 45 degrees. In another embodiment of the present invention, back straps 104 positioned in the middle or the upper portion of grid 102 provide bars 108 with a slope having a staggered pitch. By adjusting the length of back straps 104 between lead ring 106 and last bar 108-12, grid 102 can have a steep angle at the bottom and a gradual slope at the top or vice versa.

Cable grid 102 is made with a series of bars 108 secured to back straps 104. In one embodiment of the present invention, bars 108 are secured to back straps 104 using tuck splicing. Tuck splicing can be used to achieve a balance between flexibility and consistency in grid 102 by maintaining a consistent bar spacing and a fixed layout of grid 102. While the splicing holds bars 108 tightly to back straps 104, it allows for some movement when marine species sorting apparatus 100 is compressed for storage. When marine species sorting apparatus 100 is deployed and fishing, the splicing allows for bars 108 to form a well-defined grid.

Bars 108 are secured to back straps 104 at predetermined locations to maintain consistent bar spacing for a predetermined grid layout. In one embodiment of the present invention, bar spacing corresponds to the number of strands on each of back straps 104 between each of bars 108 and the corresponding tuck splice. In an exemplary layout shown in FIG. 2, the strand count for each of back straps 104 can be found between each of bars 108. In FIG. 2, the number followed by the letter "s" on the layout denotes the number strands between each bar and the tuck splice, which corresponds to a bar spacing. For example, "3s" denotes 3 back strap strands between a bar and the tuck splice and corresponds to a bar spacing of about 3 inches. In a typical embodiment of the present invention, bar spacing at the central region of grid 102 is narrower than the bar spacing along the sides of grid 102. Bar spacing along the sides of grid 102 is increased to compensate for the transition between the flat center of grid 102 to the curved sides of grid 102. In one embodiment of the present invention, bar spacing at the central region of grid 102 is about 3 inches. The ends of bars 108 that are farthest from the opening at the posterior end of grid 102 are secured to lead ring 106 and the ends of bars 108 positioned at or closer to the opening at the posterior end of grid 102 are secured to GFE 114.

Figure 4:
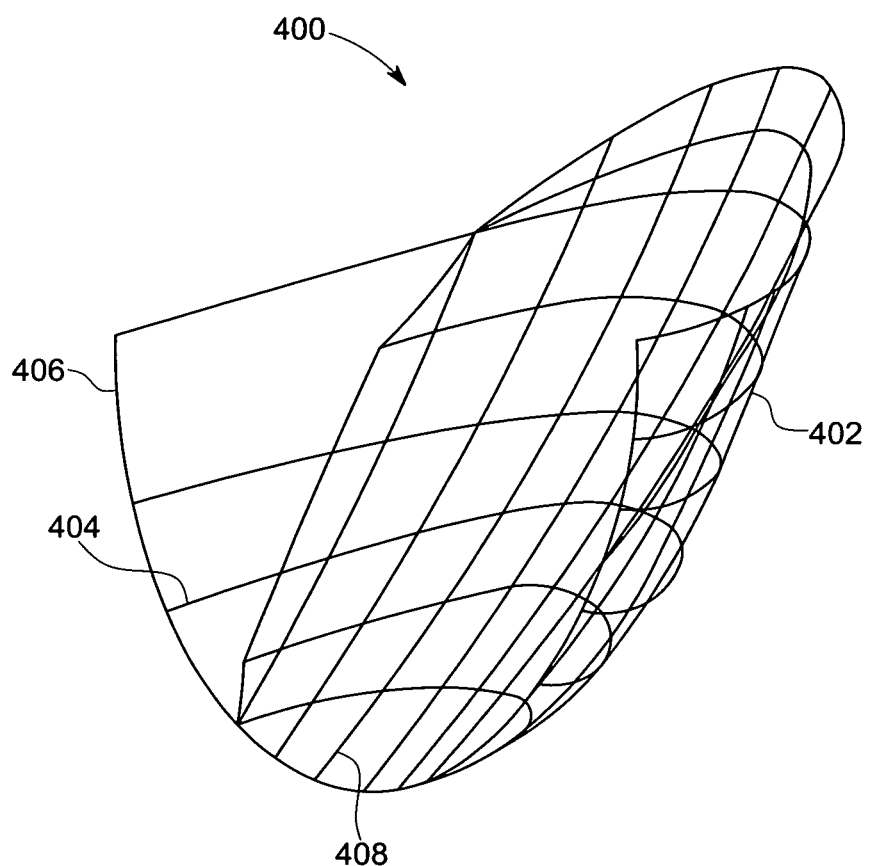
FIG. 4 illustrates a second embodiment of marine species sorting apparatus in accordance with an embodiment of the present invention.
Figure 5:
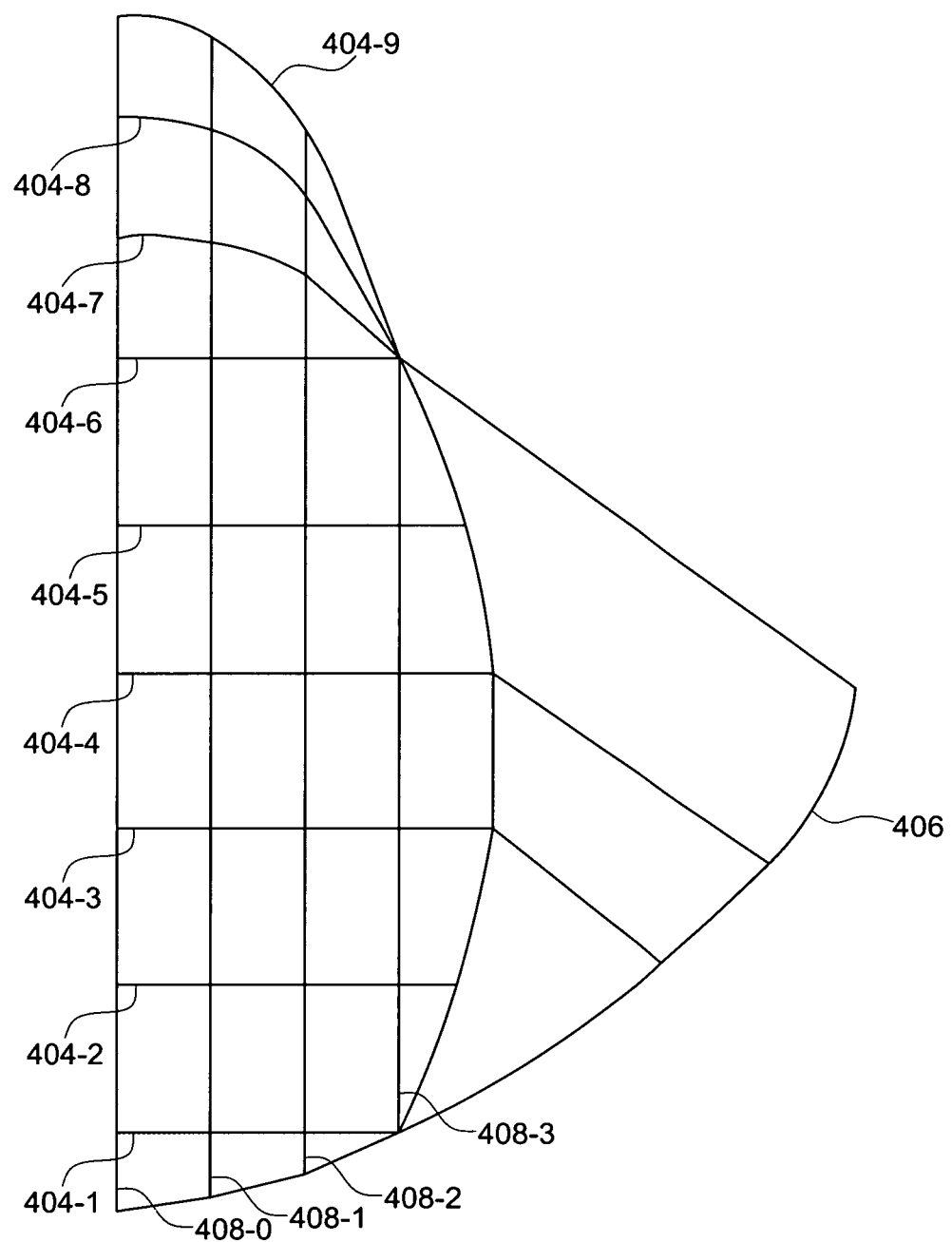
FIG. 5 illustrates an exemplary layout representing half grid of marine species sorting apparatus in accordance with the second embodiment of the present invention.

Back straps 104 are positioned perpendicular to bars 108, and parallel to each other with a predetermined space between each other and with a degree of offset. The length of back straps 104 are shortest when positioned away from the opening at the posterior end of grid 102 and longest when positioned at or closer to the opening at the posterior end of grid 102. In the layout shown in FIG. 2 for an exemplary embodiment in accordance with the present invention, the distance between the back straps is denoted on the layout. The distance between back straps 104 is determined by measuring and marking locations of the tucks on bars 108. The distance and placement of the marks for tuck splicing can be found on the layout. Parallel back straps 104 with consistent distance between them are obtained when back straps 104 are spliced to the appropriate tuck marks on bars 108. The distance between back straps 104 is shorter towards the lead ring and farthest apart at the center bar 108-0. In some embodiments of the present invention, back straps 104 at the center of grid 102 are parallel, as shown in FIGS. 4 and 5. Back straps 104 fold around from the center to the sides of grid 102 to allow bars 108 located at the corners of grid 102 to shift and realign such that bar spacing at the corners and sides of grid 102 become comparable to the bar spacing at the center of grid 102 when grid 102 is submerged in ocean for fishing.

Flexibility of bars 108 can be limited by bar spacing. The spacing between back straps 104 can also be used to control bar spacing between two parallel bars having a predetermined degree of flex. Narrower spacing between back straps 104 can result in stiffer bars 108. Using fewer back straps 104 in grid 102 can result in a lighter grid 102. In an exemplary embodiment of the present invention, using a ½-inch cable for 1×19 bars and 9/16-inch cable for 6×19 back straps with 18 inches spacing between back straps and a bar spacing of about 3.5 inches can result in a grid capable of enduring more than 40 lbs. of force and spread the bars apart no more than ½-inch while the net is under tow. Stiffer cable bar material (such as 9/16 in. or larger diameter) allows for increased spacing between back straps 104, or allows for the use of fewer back straps 104.

Back straps 104 achieve a parabolic shape when marine species sorting apparatus 100 is submerged in ocean and deployed for fishing. The parabolic shape is achieved using setback in back straps 104. Setback is the length of back straps 104 between lead ring 106 and the last bar 108-12. Setbacks maintain the center of cable grid 102 at a predetermined angle. The shape of the parabola required for a predetermined setback of back straps 104 is set by varying the lengths of back straps 104. Lengths of back straps 104 decreases from back strap 104-6 to back strap 104-1 such that back strap 104-6 forms the width of the parabola. Length of back strap 104-6 that forms the width of the parabola is further determined by the length of the opening at the posterior end of grid 102 in trawl net. The manner in which back strap 104-6 (OBS) and GFE 114 are secured to the webbing at the opening in trawl net will determine the width and shape of grid 102 at the opening. In one embodiment of the present invention, the dimensions of the opening are selected to maintain a shallow dip of at least three meshes below the first mesh of the forward cut in the bosom section to round the grid at the opening. Lengths of back straps 104 further influences the distance between lead ring 106 and the opening section of grid 102.

In some embodiments of the present invention, back strap 104-6 (or the OBS) can be modified to form a grid frame extension 114 at the top of grid 102, as further shown in FIGS. 1 and 2. Grid frame extension 114 increases the surface area of grid 102 while reaching up into a flap netting positioned over an opening at the posterior end of grid 102, and sealing the flap netting to grid 102 by increasing the length of grid 102 exclusively at the bosom section of grid 102 at the opening. Grid frame extension 114 is formed by anchoring an additional back strap 104-7 to back strap 104-6, as shown in FIGS. 1 and 2. Back strap 104-7 will be referred to as the Grid Frame Extension (GFE). Each of bars 108-0 through 108-6 is extended to connect with back strap 104-7 such that bar 108-0 is positioned at the apex of grid frame extension 114. In one embodiment of the present invention, bar 108-0 is extended by about 12 inches longer than the original length. Each of bars 108-0 through 108-6 terminating at back strap 104-7 is connected to back strap 104-7 using a terminal coupler 112 and secured to back strap 104-6 using tuck splicing. In some embodiments of the present invention, the dimensions of terminal coupler 112 located at the center of grid frame extension 114 is selected to accommodate a cable including about three strands. Back strap 104-7 is capable of forming an arch having a greater degree of curvature than back strap 104-6. Accordingly, the strand count on back strap 104-7 may differ from the strand counts on back strap 104-6. Bars 108-0 through 108-6 are secured to back strap 104-6 and the ends of bars 108-0 through 108-7 are anchored to back strap 104-7. The ends of back strap 104-7 are anchored to back strap 104-6 at predetermined locations. Table 1 provides exemplary dimensions for back straps 104, bars 108, lead ring 106, bar spacings, and back strap spacings along center bar 108-0 for the exemplary embodiment (Type I) shown in FIG. 2.

TABLE 1

Type I Cable Grid (FIGS. 1-2)

| Cable Type | Cable Length |
| --- | --- |
| Lead Ring | 18'10" |
| Bars | |
| 0 | 10' |
| 1 | 9'11" |
| 2 | 9'9" |
| 3 | 9'7" |
| 4 | 9'4" |
| 5 | 9'1" |
| 6 | 8'9" |
| 7 | 8'5" |
| 8 | 7'5" |
| 9 | 7'1" |
| 10 | 6'8" |
| 11 | 6'3" |
| 12 | 5'8" |
| Backstraps | |
| 1 | 4'6" |
| 2 | 6'8" |
| 3 | 9' |
| 4 | 12' |
| 5 | 16' |
| 6 | 25'3" |
| 7 | 6'6" |

| Backstraps | Distance between backstraps at bar 0 |
| --- | --- |
| 0-1 | 24" |
| 1-2 | 18" |
| 2-3 | 18" |
| 3-4 | 18" |
| 4-5 | 18" |
| 5-6 | 12" |
| 6-7 | 12" |

Figure 3:
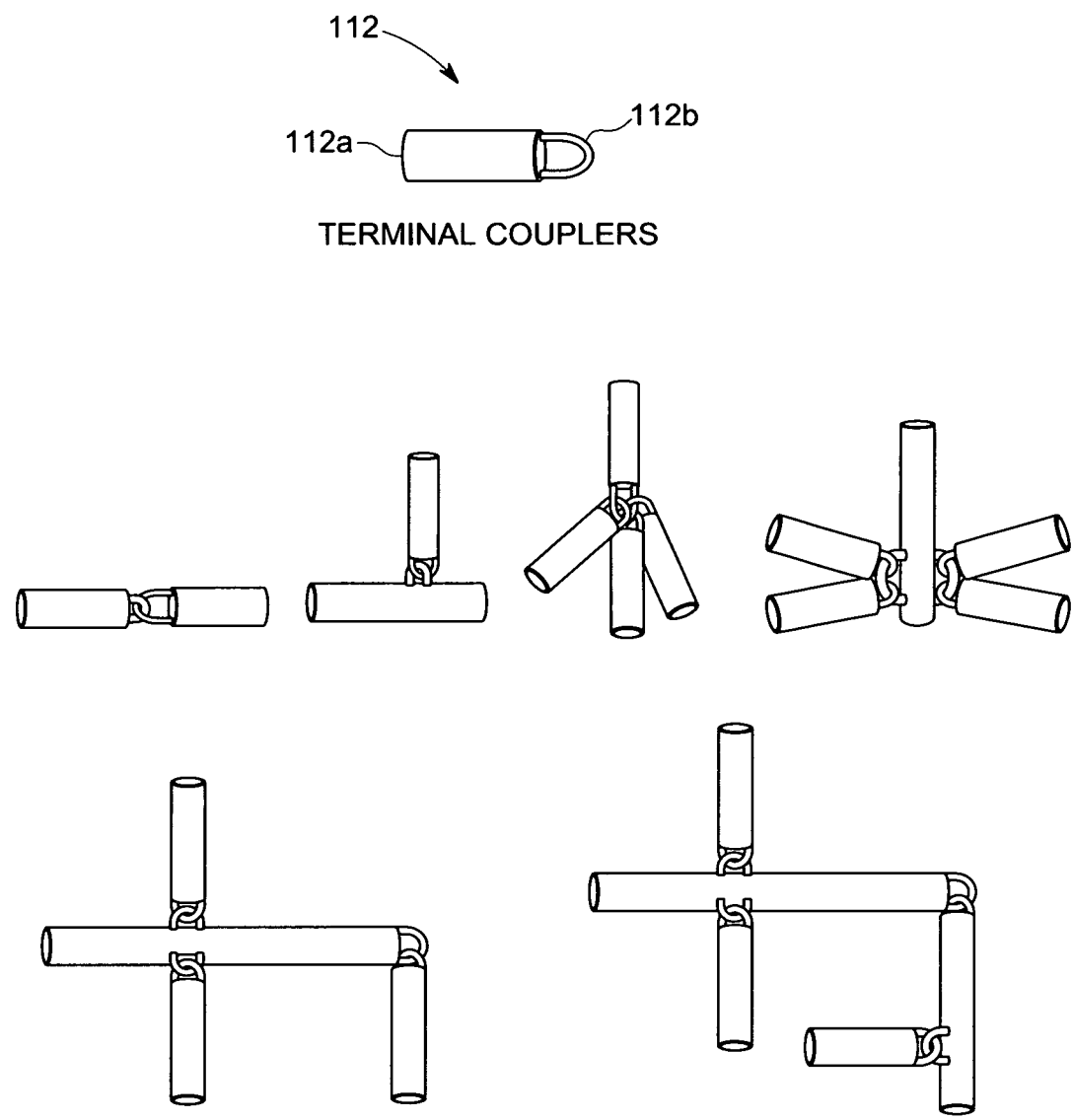
FIG. 3 illustrates exemplary terminal couplers used in embodiments of the present invention.

The ends of each of back straps 104 and one end of each of bars 108 are anchored to lead ring 106 using terminal couplers 112. In some embodiments of the present invention, the number of terminal couplers 112 needed for cable grid 102 can be determined by multiplying the total number of bars 108 and back straps 104 by two. In one embodiment of the present invention, each of terminal couplers 112 is a cylindrical pipe with one open end 112a for receiving each of back straps 104 and each of bars 108 and a half-ring link 112b welded to the second end of the pipe, as shown in FIG. 3. The diameter of open end 112a is selected to receive back straps 104 and bars 108. The length of terminal couplers 112 can range from about 2 inches to about 6 inches. In one embodiment of the present invention, terminal couplers 112 can be made of ½-inch s-40 (304) Stainless steel. The diameter of half-ring link 112b can be about a one-quarter inch. The ends of each of back straps 104 and each of bars 108 are inserted into open end 112a of terminal couplers 112 and secured by crimping open end 112a. Terminal couplers 112 can be linked or welded together to have multiple open ends for anchoring multiple back straps 104 and bars 108 to one location, or to form knuckles or corners, as further shown by exemplary embodiments of terminal couplers 112 in FIG. 3. In one embodiment of the present invention, terminal couplers 112 having two open ends are used to anchor one of back straps 104 and one of bars 108 to the same predetermined location on lead ring 106.

Terminal couplers 112 anchored to lead ring 106 are oriented in the same direction and are positioned at predetermined locations on lead ring 106. In one embodiment of the present invention, terminal couplers 112 are oriented in a direction substantially facing the posterior end of marine species sorting apparatus 100. Terminal couplers 112 are anchored to lead ring 106 by locking half-ring link 112b on lead ring 106 at predetermined locations on lead ring 106. In one embodiment of the present invention, each half-ring link 112b of terminal couplers 112 are locked into position on lead ring 106 by unwinding a pair of strands on lead ring 106 to the predetermined location on lead ring 106, inserting the unwound pair of strands through the eye of half-ring link 112b, sliding half-ring link 112b to the predetermined location, and winding the pair of strands to anchor half-ring link 112b to the predetermined location on lead ring 106. In one embodiment of the present invention, spacing between terminal couplers 112 anchored to lead ring 106 correspond to the relative distance between back straps 104 on lead ring 106. In another embodiment of the present invention, spacing between terminal couplers 112 anchored to lead ring 106 correspond to the relative bar spacing between each of bars 108 terminating at lead ring 106, grid frame extension 114 or back strap 104-6. Terminal couplers 112 can provide a pivoting joint while limiting the ability of each of back straps 104 and each of bars 108 to twist. A desired layout of grid 102 can be maintained with the combined ability of terminal couplers 112 to limit the twisting of each of bars 108 and the ability of each tuck splicing to maintain a consistent bar spacing.

Lead ring 106 is located along the bottom of grid 102 and forms a foundation for cable grid 102. Lead ring 106 anchors back straps 104 into the fishing circle of a trawl and positions bars 108 of grid 102 away from the opening. Lead ring 106 serves as a vertical base to offset back straps 104 and hold bars 108 at an angle. The bottom end of bars 108 are secured to the bottom center section of lead ring 106 and back straps 104 are secured along either side of lead ring 106.

In one embodiment of the present invention, lead ring 106 is formed by connecting the ends of a cable into a circle to form a round hoop, as shown in FIG. 1. Connections can be made by inserting each end of lead ring 106 into the open ends of a cylindrical pipe and crimping the pipe to secure the ends of lead ring 106 to the pipe. Lead ring 106, as shown in FIG. 1, can be used to funnel large volume catches that push down the trawl bellies towards grid 102. In embodiments of the present invention, as shown in FIG. 1, cable grid frame 110 is parabolic resulting in a grid that has more area for sorting fish than a flat rigid grid of same height and width. Embodiments of the present invention, as shown in FIG. 1, are suitable for use with high profile trawls (HPT). Exemplary high-profile trawls include a Flynet fish trawl, Midwater trawls, four seam box nets, fish trawls having circular cross section at the tail end of the bellies, and the like.

Figure 6:
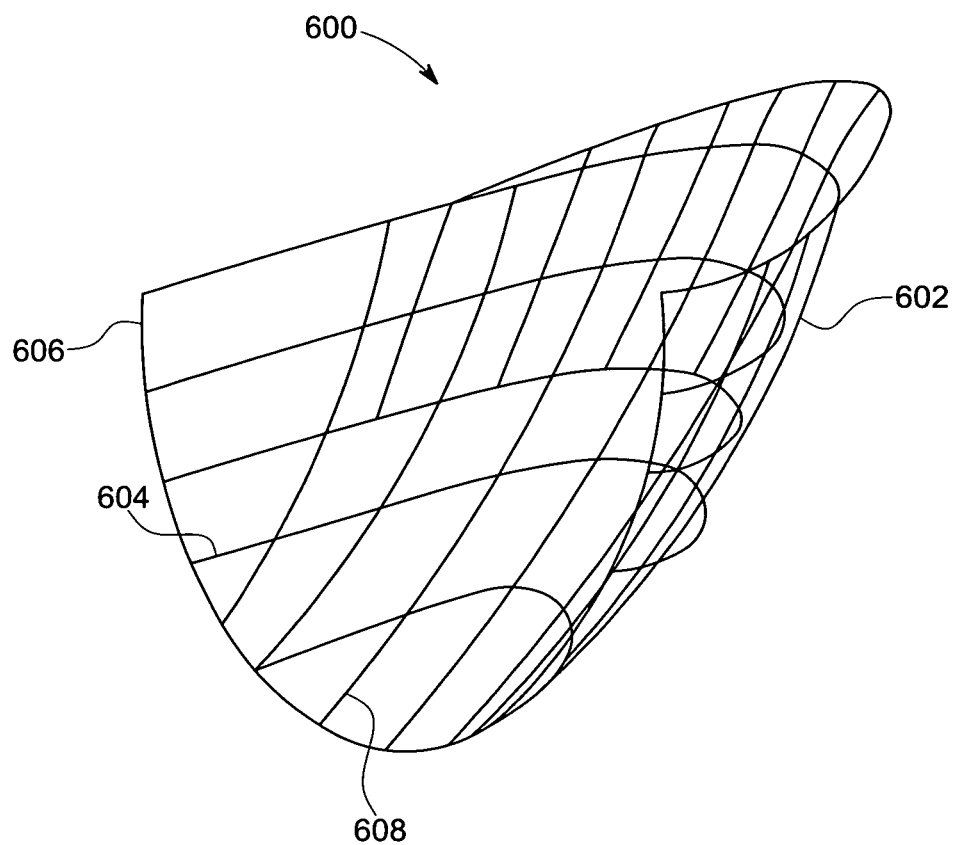
FIG. 6 illustrates another embodiment of marine species sorting apparatus having an alternate layout of bars and back straps.
Figure 7:
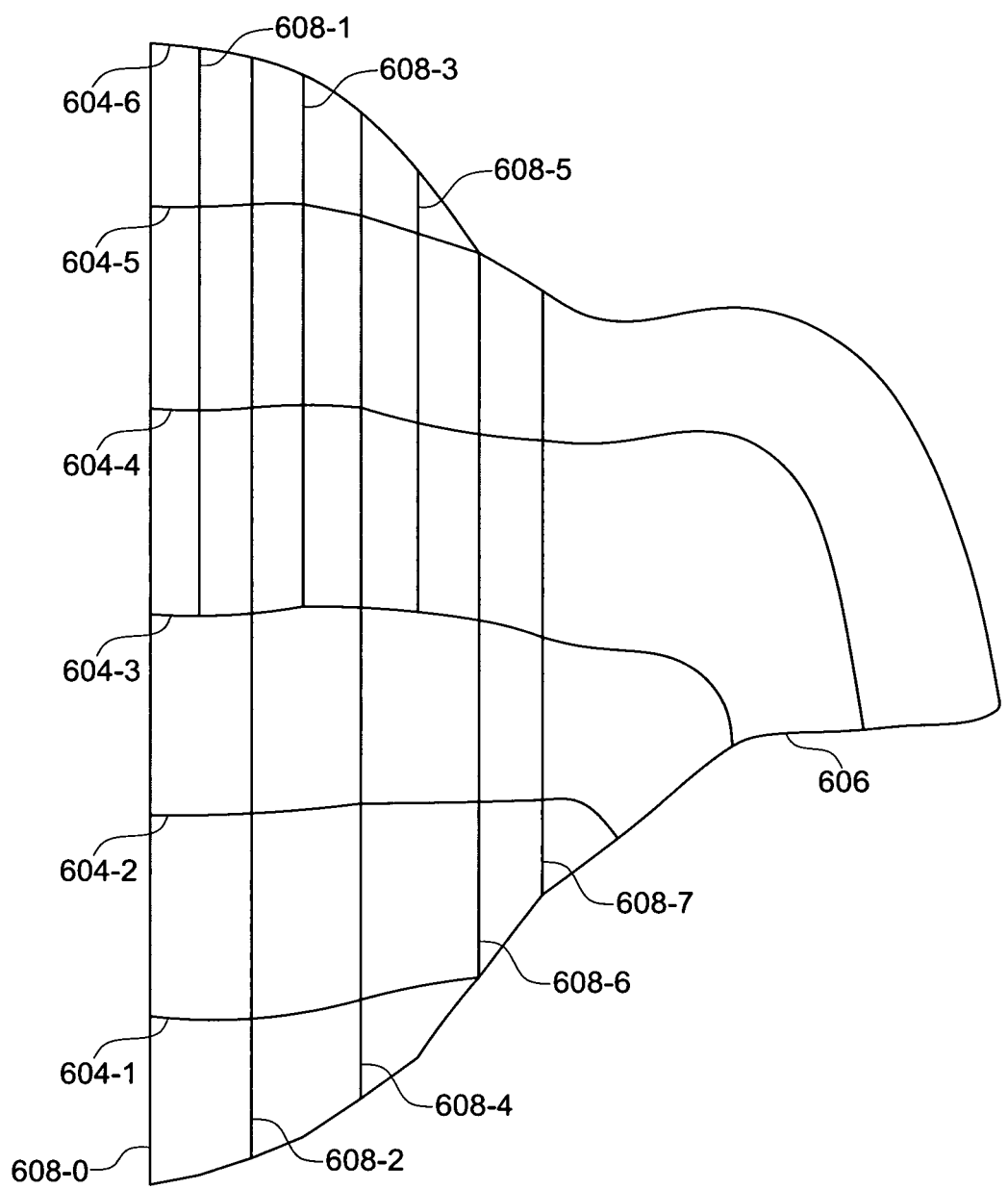
FIG. 7 illustrates an exemplary layout representing half grid of marine species sorting apparatus having alternate layout of bars and back straps.

FIG. 4 illustrates a marine species sorting apparatus 400 in accordance with a second embodiment of the present invention, including a lead ring 406 that is a semi-circular hoop formed by securing each end of lead ring 406 to back strap 404-6 to open the top of lead ring 406, as shown in FIGS. 4 and 5. FIG. 5 illustrates an exemplary layout representing half grid of marine species sorting apparatus 400. Lead ring 406 serves as a vertical base to offset back straps 404 and hold bars 408 at an angle. The bottom end of bars 408 are secured to the bottom center section of lead ring 406. FIG. 6 illustrates another embodiment of marine species sorting apparatus having an alternate arrangement of bars and backstraps, as shown in the exemplary layout of FIG. 7. Table 3 provides exemplary dimensions of back straps, bars, lead ring, bar spacings, and back strap spacings along the center bar for the exemplary embodiments (Type II-i and Type II-ii) shown in FIGS. 5 and 7.

TABLE 2

| Type II-i Cable Grid (FIGS. 4-5) | | Type II-ii Cable Grid (FIGS. 6-7) | |
|---|---|---|---|
| Cable Type | Cable Length | Cable Type | Cable Length |
| Lead Ring | 13'2.5" | Lead Ring | 10' |
| Bottom | 3'10.5" | | |
| Sides | 4'8" | | |
| Bars | | Bars | |
| 0 | 8' | 0 | 7'6" |
| 1 | 7'9" | 1 | 3'9" |
| 2 | 7' | 2 | 7'3" |
| 3 | 5' | 3 | 3'6" |
| | | 4 | 6'5" |
| | | 5 | 2'11" |
| | | 6 | 4'10" |
| | | 7 | 3'10" |
| Backstraps | | Backstraps | |
| 1 | 3'6" | 1 | 3'4" |
| 2 | 4'2" | 2 | 5' |
| 3 | 4'8" | 3 | 6'4" |
| 4 | 4'8" | 4 | 7'11" |
| 5 | 4'2" | 5 | 9'6" |
| 6 | 3'6" | 6 | 4'6" |
| 7 | 4'3" | | |
| 8 | 5'2" | | |
| 9 | 6'5.5" | | |
| Set Back | | | |
| 1 | 1'5" | | |
| 2 | 2'1" | | |
| 3 | 3'6" | | |

TABLE 2-continued

| Type II-i Cable Grid (FIGS. 4-5) | | Type II-ii Cable Grid (FIGS. 6-7) | |
|---|---|---|---|
| Cable Type | Cable Length | Cable Type | Cable Length |
| Backstraps | Distance between backstraps at Bar 0 | Backstraps | Distance between backstraps at Bar 0 |
| 0-1 | 0.5" | 0-1 | 1'1" |
| 1-2 | 1' | 1-2 | 1'4" |
| 2-3 | 1' | 2-3 | 1'4" |
| 3-4 | 1' | 3-4 | 1'4" |
| 4-5 | 1' | 4-5 | 1'4" |
| 5-6 | 1' | 5-6 | 1'1" |
| 6-7 | 9" | | |
| 7-8 | 9" | | |
| 8-9 | 9" | | |

Embodiments of the present invention, as shown in FIGS. 4 and 6, are suitable for use with low-profile trawls (LPT), which have limited head rope height that translates into a vertically compressed fishing circle in the body with flat top and bottom bellies and results in a rectangular fishing circle extending as far back as the tail of the net ahead of the cod end. Exemplary low-profile trawls include flat net shrimp trawl, scraper trawls, and the like. The semicircular shape of lead ring 406 allows for the sides of lead ring 406 to spread out and open the face of grid 302, and vertically compress the shape of marine species sorting apparatus 400 to compliment the shape of the LPT at an installation site located within the tail of LPT. The semicircular shape of lead ring 406 further allows for the top of the extension section of LPT to stretch and flatten, which levels the leading edge of the LPT opening to allow the flap to lay flat and cover the opening with a tight seal.

Figure 8:
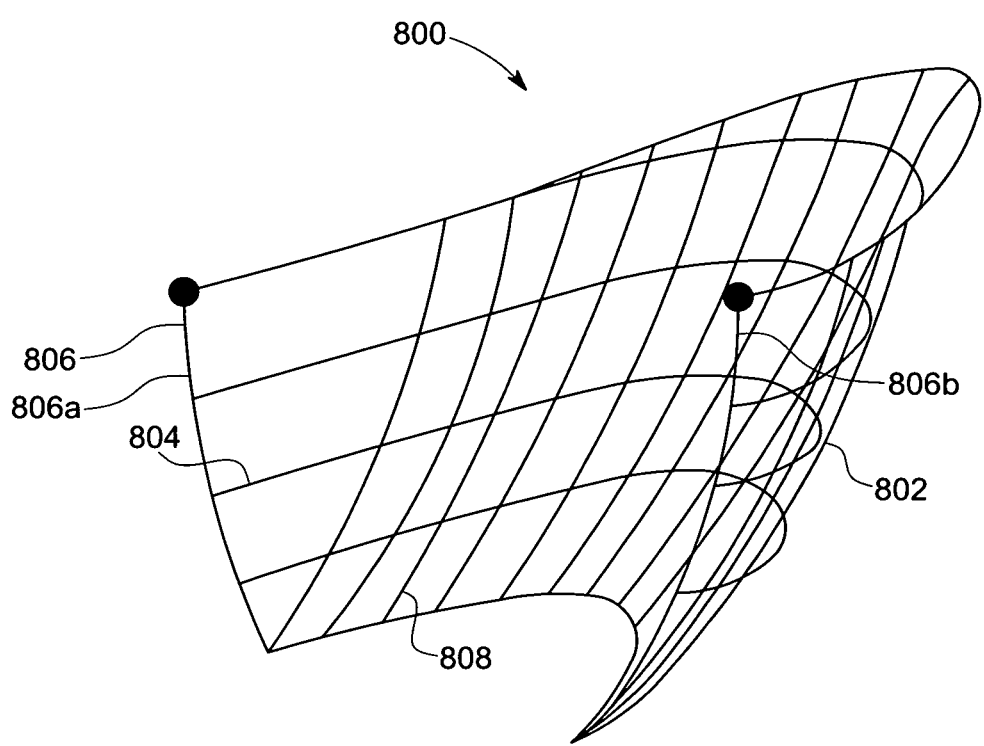
FIG. 8 illustrates a third embodiment of marine species sorting apparatus in accordance with an embodiment of the present invention.
Figure 9:
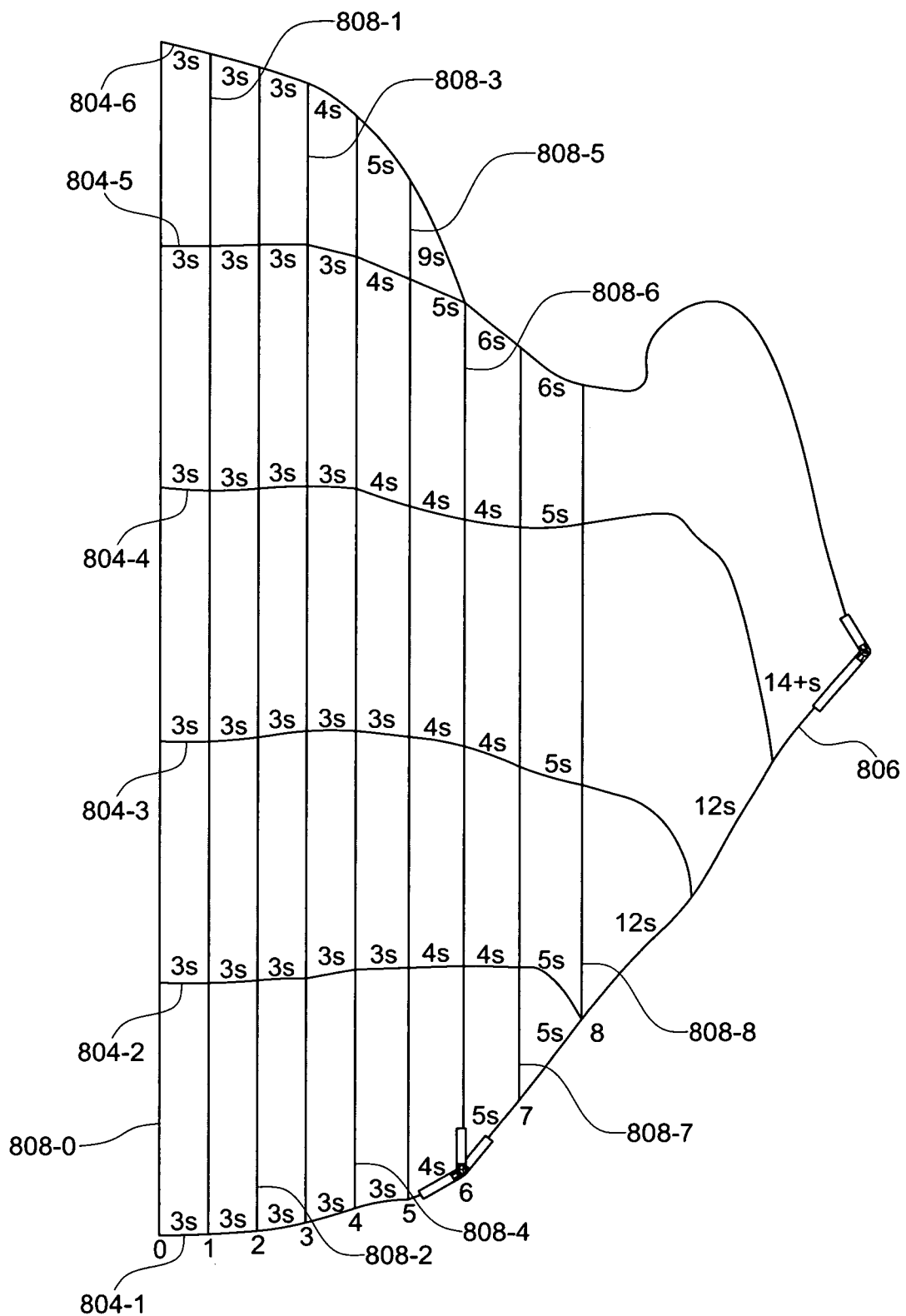
FIG. 9 illustrates an exemplary layout representing half grid of marine species sorting apparatus in accordance with the third embodiment of the present invention.

FIG. 8 illustrates a marine species sorting apparatus 800 in accordance with a third embodiments of the present invention, including a lead ring 806 formed by two cables 806a and 806b located along the sides of grid 802 to provide a base for anchoring back straps 804 to lead ring 806 along sides of grid 802, as shown in FIG. 8. Each end of back strap 804-5 is secured to top ends of lead ring cables 806a and 806b, respectively, and the bottom ends of bars 808 are secured to back strap 804-1 to form lead ring 806 that is open at the top and bottom, as further shown in FIGS. 8 and 9. FIG. 9 illustrates an exemplary layout representing half grid of marine species sorting apparatus 800. Table 3 provides exemplary dimensions of back straps, bars, lead ring, bar spacings, and back strap spacings along the center bar for the exemplary embodiment (Type II-iii) shown in FIG. 9.

TABLE 3

| Type II-iii Cable Grid (FIGS. 8-9) | |
|---|---|
| Cable Type | Cable Length |
| Lead Ring | 7' |
| Sides | 3'6" |
| Bars | |
| 0 | 6'8" |
| 1 | 6'6" |
| 2 | 6'6" |
| 3 | 6'5" |
| 4 | 6'3" |
| 5 | 6' |
| 6 | 5' |
| 7 | 4'2" |
| 8 | 3'9" |
| Backstraps | |

TABLE 3-continued

Type II-iii Cable Grid (FIGS. 8-9)

| Cable Type | Cable Length |
|---|---|
| 1 | 3'4" |
| 2 | 6' |
| 3 | 7'4" |
| 4 | 9'2" |
| 5 | 12' |
| 6 | 4'6" |

| Backstraps | Distance between backstraps |
|---|---|
| 0-1 | 1'6.5" |
| 1-2 | 1'4" |
| 2-3 | 1'4" |
| 3-4 | 1'4" |
| 4-5 | 1'4" |
| 5-6 | 1'2" |

TABLE 4

Figure 10:
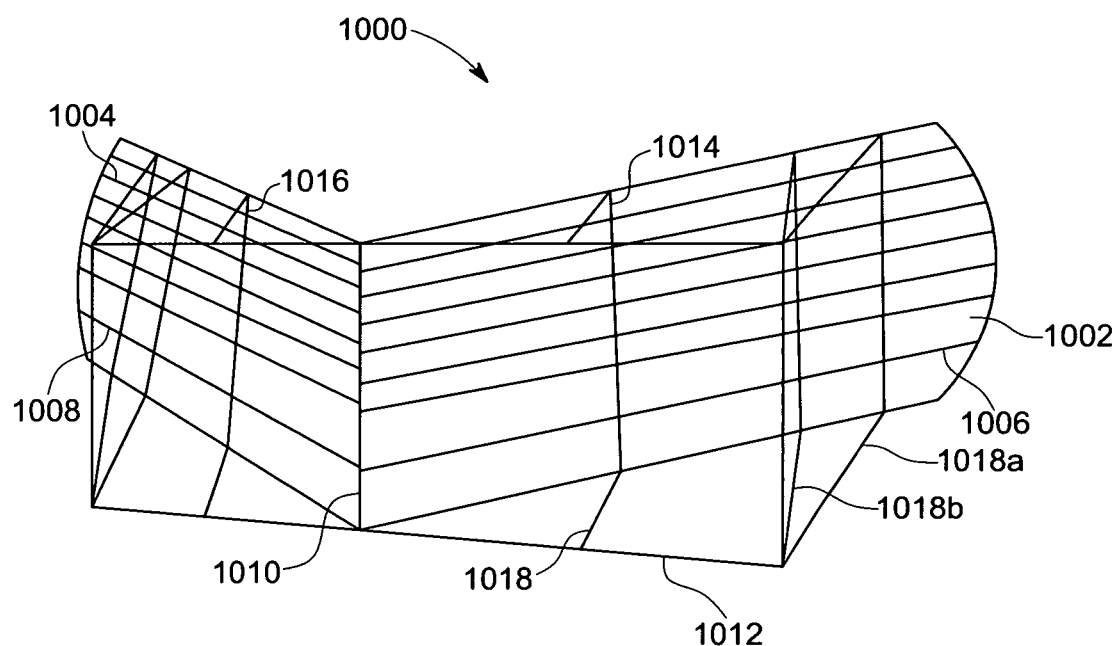
FIG. 10 illustrates an alternate embodiment of the present invention for sorting marine species having a flat horizontal shape.
Figure 11:
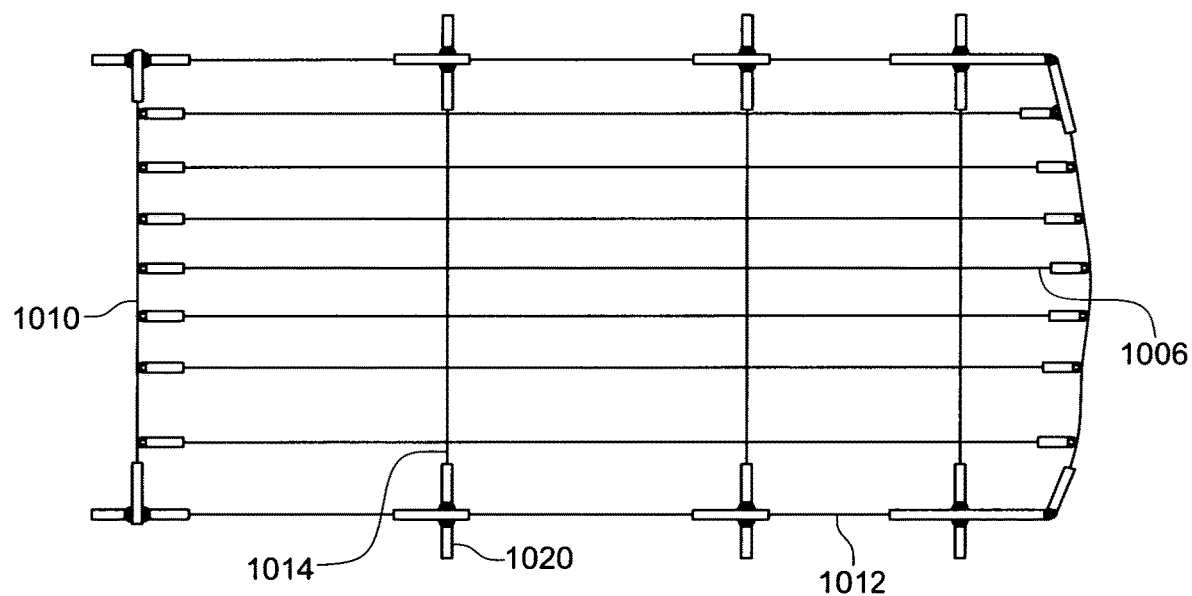
FIG. 11 illustrates an exemplary layout representing half grid of marine species sorting apparatus having a flat horizontal shape.

Type III Cable Grid (FIGS. 10-11)

| Cable Type | Cable Length |
|---|---|
| Lead Ring Setbacks | 6' |
| 1 | 17" |
| 2 | 34" |
| 3 | 48" |
| Bars | |
| 0 | 72" |
| 1 | 73" |
| 2 | 75" |
| 3 | 77" |
| 4 | 78" |
| 5 | 77" |
| 6 | 75" |
| 7 | 73" |
| 8 | 72" |

| Bars | Bar Spacing |
|---|---|
| 0-1 | 6" |
| 1-2 | 6" |
| 2-3 | 4" |
| 3-4 | 4" |
| 4-5 | 4" |
| 5-6 | 4" |
| 6-7 | 4" |
| 7-8 | 4" |
| Center Post Backstraps | 36" |
| 1 | 36" |
| 2 | 36" |
| 3 | 36" |

FIG. 10 illustrates an alternate embodiment of the present invention for sorting marine species having a flat horizontal shape, including various varieties of flounders. Exemplary varieties of flounders include *Paralicthys dentatus, Pleuronectes* sp., and the like. As shown in FIG. 10, two cable grids 1002 and 1004 are oriented on its side and connected to form a V-shaped grid. Cable grids 1002 and 1004 include bars 1006 and 1008 that are anchored to vertical back straps 1014 and 1016 and are oriented in horizontal direction with sufficient bar spacing to allow the passage of flat marine species. Marine species that do not pass through bars 1006 are discharged from the trawl net through grid openings positioned on the sides of trawl net. In one embodiment of the present invention, cable grids 1002 and 1004 is made from two panels with each panel having a length of about 5 feet and a height of about 3 feet. Cable grids 1002 and 1004 are connected at the center by a vertical lead center post 1010. In one embodiment of the present invention, cable grids 1002 and 1004 are connected at the center by anchoring bars 1006 to vertical lead center post 1010. Vertical lead center post 1010 is further connected to lead ring 1012. In one embodiment of the present invention, lead ring 1012 is rectangular shaped and is suitable for use with a LPT having four seams at the tail of the net. Bars 1006 and 1008 are secured to back straps 1014 and 1016, respectively, at predetermined locations on back straps 1014 and 1016 to maintain consistent bar spacing for a predetermined grid layout. Back straps 1014 and 1016 are positioned perpendicular to bars 1006 and 1008, and parallel to each other, with a predetermined space between each other and with a degree of offset. Setbacks 1018 between cable grids 1002 and 1004 and lead ring 1012 are used to support cable grids 1002 and 1004 in a V-shape. Setbacks 1018 are positioned using substantially same spacing used to position back straps 1014. Setbacks 1018 are anchored to cable grids 1002 and 1004 and lead ring 1012 using terminal couplers 1020, as shown in FIG. 11. FIG. 11 illustrates an exemplary layout representing half grid of marine species sorting apparatus 1000. Terminal couplers 1020 may be used to anchor back straps 104 or bars 108 to cable grids 1002 and 1004. Terminal couplers 1020 may also be used to anchor setbacks 1018 to lead ring 1012. In one embodiment of the present invention, terminal couplers 1020 having two open ends are used to anchor setbacks 1018a and 1018b to lead ring 1012, as shown in FIG. 10. Table 4 provides exemplary dimensions of back straps, bars, lead ring, bar spacings, and back strap spacings for the exemplary embodiment (Type III) shown in FIG. 11.

Figure 12:
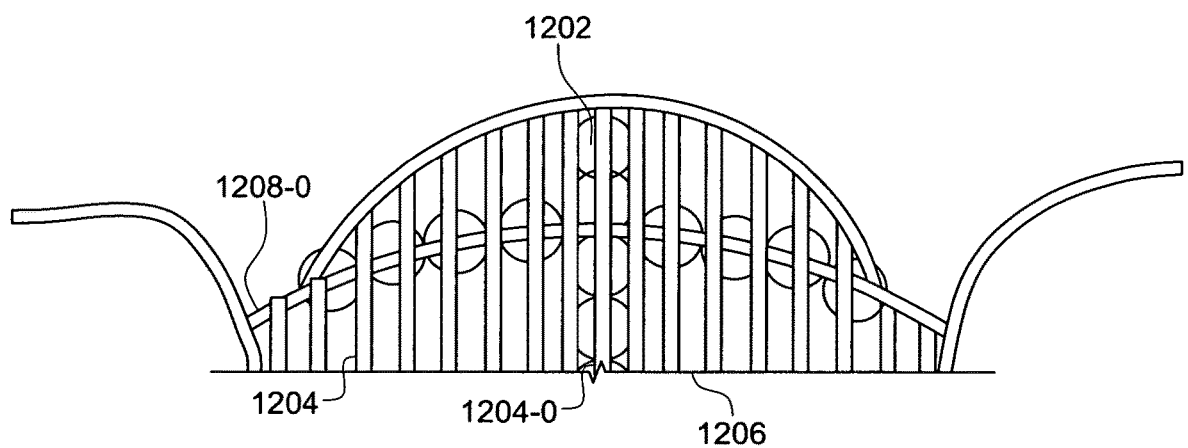
FIG. 12 illustrates an exemplary distribution of floats secured to marine species sorting apparatus in accordance with embodiments of the present invention.

In embodiments of the present invention, floats 1202 can be used to provide buoyancy to marine species sorting apparatus in accordance with embodiments of the present invention, as illustrated in FIG. 12 for Types I and II marine species sorting apparatus. In marine species sorting apparatus in accordance with embodiments of the present invention, from about 50% to about 75% of the weight of the cable used is complimented with buoyancy to help the apparatus achieve a neutral position in the profile of the trawl net. Floats 1202 are secured to bars 1204 and are positioned at predetermined locations on cable grid 1206 to provide buoyancy to cable grid 1206 and to prevent twisting of net during deployment and during operation of the trawl. In one embodiment of the present invention, floats 1202 are positioned in an area that represents the horizontal catenary of back straps 1208 and an area furthest away from any trawl webbing support, as shown in FIG. 12. In another embodiment of the present invention, floats 1202 are secured to bar 1204-0 from top of bar 1204-0 to at least midline of cable grid 1206 and to back strap 1208-0.

Marine species sorting apparatus 100 in accordance with embodiments of the present invention is installed into a tube of webbing called an extension having dimensions capable of fitting to the trawl. Cable grid 102 is sewn to extension webbing to secure cable grid 102 to the extension. Lead ring 106 is secured to the fishing circle along a straight row of meshes perpendicular to the direction the trawl is pulled when fishing. Lead ring 106 is positioned towards the front of the trawl and the opening for allowing undesired marine species to exit grid 102 is positioned towards the back or cod end of the trawl. Back straps 104 are secured to the top quarter of the extension. Location where the apex of back straps 104 are secured to extension will determine the angle of grid 102 and the shape of opening at the posterior end of grid 102. The area of the extension webbing within the apex of back strap 104, and ahead of grid 102, will define the escape opening. Opening in the webbing is cut at the end of grid 102 that is farthest from lead ring 106, or at the posterior end of grid 102, and back straps 104 are secured to the extension.

During typical operation of marine species sorting apparatus 100 installed within the trawl deployed for fishing, marine species entering the trawl are directed to marine species sorting apparatus 100 within the extension section of the trawl for sorting. Target marine species that are smaller than the bar spacing of bars 108 are directed through the bar spacing into the tail end of the trawl. The slope of grid 102 will direct marine species that are larger than the bar spacing of bars 108 through opening at the posterior end of grid 102 cut in the extension webbing of trawl.

Apparatus in accordance with embodiments of the present invention has several advantages over previous marine species sorting apparatus. More particularly, marine species sorting apparatus in accordance with embodiments of the present invention has more flexibility than a rigid grid system, which forces a trawl to conform to the shape of the grid to work properly. More specifically, marine species sorting apparatus can conform to the dynamic properties of the trawl and the changing stresses the trawl endures. A rigid grid will break before it bends and cannot be easily packed into a net reel. The use of cables into a sorting grid system, as shown in embodiments of marine species sorting apparatus, provides flexibility and simplifies the process of packing marine species sorting apparatus onto a net reel. A significant advantage of marine species sorting apparatus in accordance with embodiments of the present invention is the ability of the grid to hold its shape while being dynamic, flexing and adjusting to the tension in the trawl webbing, and transform its shape with the shape of the trawl.

Marine species sorting apparatus in accordance with embodiments of the present invention can be adapted to a variety of configurations suitable for selective trawl fishing. Construction of grid, as described herein, provides flexibility to vary the shape of marine species sorting apparatus to fit specific trawl shapes. It is thought that marine species sorting apparatus of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. An apparatus for excluding undesired marine species from a trawl net during trawling, said apparatus comprising:
   a plurality of bars arranged in a symmetrical layout extending along a direction substantially traversing longitudinal axis of the trawl net, wherein the plurality of bars are separated by at least one predetermined bar spacing, wherein each of the plurality of bars has a predetermined length, wherein the plurality of bars have a predetermined stiffness;
   a grid frame surrounding the plurality of bars to form an opening at posterior end of the apparatus, wherein distal ends of at least two of the plurality of bars positioned distally from center of the grid frame is secured to the grid frame;
   a plurality of back straps secured to at least one of the plurality of bars at a predetermined location, wherein each of the plurality of back straps is positioned perpendicular to the plurality of bars, wherein the plurality of back straps are positioned below the grid frame, wherein the plurality of back straps are separated by at least one predetermined distance;
   a grid frame extension secured to the grid frame to extend the posterior end of the apparatus above the opening, wherein the grid frame extension forms a curvature to receive flap netting positioned to seal the opening, wherein distal ends of the plurality of bars positioned proximally at center of the apparatus is secured to the grid frame extension, wherein at least one of the plurality of bars positioned proximally at the center of the apparatus is secured to the grid frame extension at apex of the curvature formed by the grid frame extension;
   a lead ring secured to ends of each of the plurality of back straps and proximal end of at least one of the plurality of bars, wherein the lead ring offsets the plurality of back straps and hold the plurality of bars at a predetermined angle, wherein the lead ring funnels marine species entering the trawl towards the plurality of bars; and
   a plurality of terminal couplers for securing the ends of each of the plurality of back straps and the proximal end of at least one of the plurality of bars to the lead ring, wherein the plurality of terminal couplers are oriented in a direction substantially facing the posterior end of the apparatus,
   wherein said apparatus is adapted for insertion within trawl body and positioned before cod end of the trawl net, wherein the lead ring is secured to fishing circle in the trawl net along a row of meshes perpendicular to the longitudinal axis of the trawl net, wherein the back straps are secured to extension webbing in the trawl net, and wherein the undesired marine species exit the trawl net through the opening formed at the posterior end of the apparatus.

2. The apparatus of claim 1, wherein each of the plurality of bars is a 1×19 stainless steel cable, and wherein each of the plurality of back straps is a 6×19 stainless steel cable.

3. The apparatus of claim 1, wherein the bar spacing separating the plurality of bars positioned proximal to the center of the grid frame is narrower than the bar spacing separating the plurality of bars positioned distally from the center of the grid frame.

4. The apparatus of claim 1, wherein the at least one of the plurality of back straps positioned distally from the grid frame is shorter than the at least one of the plurality of back straps positioned proximal to the grid frame.

5. The apparatus of claim 1, further comprising a plurality of floats secured to predetermined locations on the plurality of bars, wherein the plurality of floats provide buoyancy to the apparatus.

6. The apparatus of claim 1, wherein the at least one of the plurality of back straps is secured to at least one of the plurality of bars with tuck splicing.

7. The apparatus of claim 1, wherein the distance separating the ends of plurality of back straps is shorter than the distance separating the plurality of back straps proximal to the at least one of the plurality of bars positioned at the center of the grid frame.

8. The apparatus of claim 1, wherein the lead ring is secured to proximal end of at least one of the plurality of bars.

9. The apparatus of claim 8, wherein the lead ring is a round hoop.

10. An apparatus for excluding undesired marine species from a trawl net during trawling, said apparatus comprising:
- a grid comprising an array of plurality of bars and a plurality of back straps, wherein each of the plurality of bars is secured to at least one of the plurality of back straps at a predetermined location, wherein the plurality of bars are arranged vertically in a symmetrical layout on either side of a center bar, wherein the plurality of bars are spaced apart by at least one predetermined distance, wherein each of the plurality of bars has a predetermined length, wherein each of the plurality of back straps is positioned perpendicular to the plurality of bars;
- a grid frame secured to distal ends of at least two of the plurality of bars positioned distally from the center bar, wherein the grid frame surrounds the plurality of bars to form an opening at posterior end of the apparatus, wherein the at least one of the plurality of back straps positioned distally from the grid frame is shorter than the at least one of the plurality of back straps positioned proximal to the grid frame, wherein the distance separating the ends of plurality of back straps is shorter than the distance separating the plurality of back straps proximal to the at least one of the plurality of bars positioned at the center of the grid frame;
- a grid frame extension secured to the grid frame to extend the posterior end of the apparatus above the opening, wherein the grid frame extension forms a curvature to receive flap netting positioned to seal the opening, wherein distal ends of the plurality of bars positioned proximally at center of the apparatus is secured to the grid frame extension, wherein the center bar is secured to the grid frame extension at apex of the curvature formed by the grid frame extension;
- a lead ring secured to ends of each of the plurality of back straps and proximal end of at least one of the plurality of bars, wherein the lead ring funnels the marine species entering the trawl towards the plurality of bars, wherein the lead ring offsets the plurality of back straps and hold the plurality of bars at a predetermined angle, wherein the lead ring is secured to fishing circle along a straight row of meshes perpendicular to a direction the trawl net is pulled;
- a plurality of terminal couplers for securing the ends of each of the plurality of back straps and the proximal end of at least one of the plurality of bars to the lead ring, wherein the plurality of terminal couplers are oriented in a direction substantially facing the posterior end of the apparatus; and
- a plurality of floats secured to predetermined locations on the plurality of bars, wherein the plurality of floats provide buoyancy to the apparatus,
- wherein said apparatus is adapted for insertion within the trawl body before cod end of the trawl net, wherein the lead ring is secured to fishing circle in the trawl net along a row of meshes perpendicular to the longitudinal axis of the trawl net, wherein the back straps are secured to extension panel in the trawl net, and wherein the undesired marine species exit the trawl net through the opening formed at the posterior end of the apparatus.

11. The apparatus of claim 10, wherein each of the plurality of bars is a 1×19 stainless steel cable, and wherein each of the plurality of back straps is a 6×19 stainless steel cable.

12. The apparatus of claim 10, wherein bar spacing separating the plurality of bars positioned proximal to the center of the grid frame is narrower than the bar spacing separating the plurality of bars positioned distally from the center of the grid frame.

13. The apparatus of claim 10, wherein the lead ring is a round hoop.

* * * * *